3,592,626
METHOD OF DESICCATING FOLIAGE OF A CROP

Basil Jason Heywood, Hornchurch, and William George Leeds, London, England, assignors to May & Baker Limited, Dagenham, Essex, England
No Drawing. Continuation-in-part of application Ser. No. 751,374, Aug. 9, 1968, which is a continuation-in-part of application Ser. No. 546,606, May 2, 1966, which in turn is a continuation-in-part of applications Ser. No. 309,398, Sept. 17, 1963, and Ser. No. 389,482, Aug. 14, 1964. This application Apr. 22, 1970, Ser. No. 30,997
Int. Cl. A01n 9/00; C11c 3/00
U.S. Cl. 71—70                                                   1 Claim

ABSTRACT OF THE DISCLOSURE 3,5 - dibromo- and 3,5-diiodo - 4 - n-octanoyloxybenzonitriles are disclosed as herbicides. They are particularly useful for treatment of broad-leafed weeds in graminaceous crops, and for desiccating the foliage of potato, cotton, hop and leguminous seed crops. Enhanced activity compared with the parent hydroxybenzonitriles is described.

CROSS REFERENCES TO RELATED APPLICATIONS

This application is a continuation-in-part of our copending application Ser. No. 751,374, filed Aug. 9, 1968, now abandoned, which is a continuation-in-part of our now abandoned application Ser. No. 546,606, filed May 2, 1966, which is in turn a continuation-in-part of our now abandoned applications Ser. Nos. 309,398, filed Sept. 17, 1963, 389,482, filed Aug. 14, 1964.

This invention relates to benzonitrile derivatives useful as herbicides.

As a result of research and experimentation it has been discovered that certain benzonitrile derivatives have especially valuable herbicidal properties. These benzonitrile derivatives are compounds of the formula:

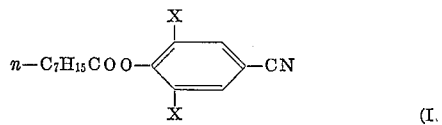

where the symbols X represent a bromine or iodine atom, i.e. 3,5-dibromo- and 3,5 - diiodo-4-n-octanoyloxybenzonitriles. Although 3,5-dibromo-4-hydroxybenzonitrile and 3,5-diiodo-4-hydroxybenzonitrile per se posses valuable herbicidal activity, the corresponding n-octanoyloxy derivatives have surprisingly been found to possess significantly enhanced activity against a wide variety of important weed species, compared with the parent phenol in the form of, for example, alkali metal salts and lower esters, such as the butyrates.

This superiority in the case of 3,5-dibromo-4-n-octanoyloxybenzonitrile has been demonstrated both in tests designed to compare overall weed control and also in field trials in which activity against specific weed species was compared. Details of these tests follow:

(A) Overall weed control tests—United States of America

The herbicidal activity of 3,5-dibromo-4-n-octanoyloxybenzonitrile was directly compared with that of 3,5-dibromo - 4 - hydroxybenzonitrile as the potassium salt at 13 sites in crops of cereals, onions and alfalfa. In general, doses of 4 oz./acre, 6 oz./acre and 8 oz./acre phenol equivalents of each herbicide were applied when the crop was at a suitable stage of growth and broad leafed weeds had emerged. The potassium salt was applied as an aqueous solution, and the ester as an emulsion in water. Two to four weeks later the degree of overall weed control was assessed for each treatment at each site, either by population counts or, in a few instances, by a visual rating. The following table summerises the results obtained.

TABLE I

| Degree of weed control (all broad leafed species) | 3,5-dibromo-4-n-octancyloxybenzonitrile—dosage rate, oz./acre | | | 3.5-dibromo-4-hydroxybenzonitrile potassium salt—dosage rate, oz./acre | | |
|---|---|---|---|---|---|---|
| | 4 | 6 | 8 | 4 | 6 | 8 |
| Very good (91–100%) | 6 | 8 | 4 | 0 | 5 | 4 |
| Commercially acceptable (71–90%) | 2 | 2 | 1 | 5 | 2 | 0 |
| Commercially unacceptable (71%) | 1 | 1 | 0 | 4 | 4 | 1 |

(B) Overall weed control tests—Canada

In tests at nine sites similar to those described above under A, the following results were obtained.

TABLE II

| Degree of week control (all broad leafed species) | 3,5-dibromo-4-n-octancyloxybenzonitrile—dosage rate, oz./acre | | | 3,5-dibromo-4-hydroxybenzonitrile potassium salt—dosage rate, oz./acre | | |
|---|---|---|---|---|---|---|
| | 4 | 6 | 8 | 4 | 6 | 8 |
| Very good (91–100%) | 4 | 6 | 8 | 2 | 2 | 2 |
| Commercially acceptable (71–90%) | 3 | 1 | 0 | 1 | 1 | 0 |
| Commercially unacceptable (<71%) | 2 | 2 | 1 | 6 | 6 | 7 |

(C) Comparative field trials—specific weeds

The results of comparative field trials in respect of individual weed species at the specified dosage rates (4 or 8 oz./acre) are summarized in the following tables. [The symbol S indicates consistently good control, MS indicates control dependent on environmental factors, MR indicates partial control and R indicates no control.]

TABLE III

| Weed species | 3,5-dibromo-4-n-octanoyloxy-benzonitrile | 3,5-dibromo-4-hydroxy-benzonitrile potassium salt |
|---|---|---|
| Descurainia sophia | S (4) | MR (4) |
| Melandrium noctiflorum | MS (8) | R (8) |
| Chenopodium album | S (4) | MS (4) |
| Neslia paniculata | S (4) | MS (4) |
| Amsinckia spp | S (8) | MS (8) |
| Saponaria vaccaria | MS (8) | MR (8) |
| Veronica hederifolia | MS (8) | MR (8) |
| Spergula arvensis | MR (8) | R (8) |

In Table IV which follows the figures given indicate the dosage rate in oz./acre required to produce 90% control of the indicated weed species.

TABLE IV

| Weed species | Number of sites | 3,5-dibromo-4-n-octanoyloxy benzonitrile | 3,5-dibromo-4-hydroxy-benzonitrile potassium salt |
|---|---|---|---|
| Sinapis arvensis | 2 | 2 | 9.5 |
| Descurainia sophia | 1 | 2 | >12 |
| Thlaspi arvensis | 5 | 2.7 | 5.9 |
| Neslia Paniculata | 3 | 2.8 | 5.7 |
| Polygonum convulvulus | 13 | 3.0 | 4.0 |
|  | 3 | 4.3 | >12 |
| Polygonum scabrum | 2 | 2 | 6.5 |
| Polygonum persigaria | 3 | 3.7 | 7.7 |
| Saponaria vaccaria | 2 | 6.5 | >12 |
| Chenopodium album | 3 | 2.8 | 8 |
| Ambrosia artemesifolia | 5 | 4.0 | 5.4 |
|  | 4 | 8.5 | >12 |

(D) Comparative field trials—specific weeds

The results of comparative field trials in respect of individual weed species at the specified dosage rates (4 or 8 oz./acre) on diiodo analogues of the compounds tested as described above are summarized in Table V which follows. In this table the symbol S is dicates consistently good weed control, MS indicates control dependent on environmental factors, MR indicates partial control and R in dicates no control.

TABLE V

| Weed species | 3,5-diiodo-4-n-octanoyloxy-benzonitrile | 3,5-diiodo-4-hydroxy-benzonitrile sodium salt |
|---|---|---|
| Descurainia sophia | S (8) | MS (8) |
| Melandrium noctiflorum | MS (8) | R (8) |
| Chenopodium album | S (4) | MS (4) |
| Neslia paniculata | S (4) | MS (4) |
| Amsinckia spp | MS (8) | MR (8) |
| Saponaria vaccaria | MR (8) | R (8) |
| Veronica hederifolia | MS-S (8) | MS (8) |
| Spergula arvensis | MR (8) | R (8) |

(E) Overall weed control tests—United Kingdom

Overall field weed control tests were carried out on a number of sites in the United Kingdom to enable the performance of n-butyrates and octanoates of 3,5-dibromo-4-hydroxybenzonitrile to be directly compared. Doses of 4 oz., 6 oz., and 8 oz. were applied per acre (calculated as the phenol equivalent) when the crop was at a suitable stage of growth and broad-leaved weeds had emerged. Both test compounds were applied as emulsions in water obtained by diluting with water emulsifiable concentrates containing 35% w./v. phenol equivalent of the test compound, 15% w./v. ofthe wetting agent Ethylan TU and the remainder Naphtha CW. Results were assessed 6–10 weeks later on the basis of population counts. The following table summarizes the results obtained.

TABLE VI

| Degree of weed control (all broad leafed species) | 3,5-dibromo-4-hydroxybenzointrile n-butyrate—dosage rate, oz./acre | | | 3,5-dibromo-4-hydroxybenzonitrile n-octanoate—dosage rate, oz./acre | | |
|---|---|---|---|---|---|---|
| | 4 | 6 | 8 | 4 | 6 | 8 |
| Very good (91–100%) | | 1 | 1 | | 1 | 2 |
| Commercially acceptable (71–90%) | 9 | 9 | 10 | 11 | 13 | 15 |
| Commercially unacceptable (71%) | 13 | 12 | 11 | 11 | 8 | 5 |

Apart from exceptionally high herbicidal activity, the esters characteristic of the present invention possess other properties which contribute to an important degree to their value as herbicides. First they possess high solubility in organic solvents such as Naphtha CW or xylene. This is a particularly valuable property in practice because it renders the compounds particularly suitable for the preparation of stable, self-emulsifiable concentrates in for example Naphtha CW. In this connection the solubility of the free phenols and such other esters as the acetates, propionates and butyrates in such solvents is very considerably lower as illustrated by the following table.

TABLE VII

| | Solubility (percent) in Naphtha CW at 25–28° C. | | | | |
|---|---|---|---|---|---|
| | $C_2$ | $C_4$ | $C_6$ | $C_8$ | $C_{12}$ |
| 3,5-dibromo-4-n-alkanoyloxybenzonitrile | 5 | 50 | 55 | 75 | ca. 10 |
| 3,5-diiodo-4-n-alkanoyloxybenzonitrile | 1 | 14 | 30 | 90 | 10 |

Second, it has been shown that the dermal toxicity of the n-octanoate of 3,5 - dibromo - 4-hydroxybenzonitrile is significantly lower than that of a corresponding lower ester, namely the n-butyrate. Thus toxicity tests have established that the cumulative sub-acute toxicity of the octanoate is less than that of the butyrate by a factor of at least 4.

According to one feature of the present invention the benzonitrile derivatives of Formula I are used to control the growth of weeds. Usually the benzonitrile derivatives are associated with compatible diluents suitable for use in herbicidal compositions, for example as described below.

The benzonitrile derivatives of Formula I can be used to control the growth of one or more broad-leafed weeds such as *Ambrosia artemisiifolia, Amaranthus retroflexus, Atriplex patula, Barbarea vulgaris, Brassica alba, Brassica nigra, Capsella bursa-pastoris,* Convolvulus species, Cirsium species, *Chenopodium album, Chrysanthemum segetum, Datura stramonium, Erysimum cherianthoides, Euphorbia lathyrus, Galium aparine, Matricaria inodora, Matricaria chamomilla, Portulaca oleraceae, Polygenum aviculare, Polygenum convolvulus, Polygenum lapathifolium, Polygonum persicaria, Polygonum hydropiper, Polygonum scarbrum, Raphanus raphanistrum,* Rumex species, *Spergula arvensis, Stellaria media,* Sonchus species, *Senecio vulgaris, Sinapis arvensis,* Veronica species and Xanthium species. The amounts of benzonitrile derivatives or derivatives applied to the weeds to control their growth vary with the nature of the weds, the compositions applied, the mode and time of application and, when the growth of weeds is to be controlled in the presence of crops, the nature of the crops. In general, taking these factors into account, application rates of 4 to 8 oz./acre give good results. It must, however, be understood that higher application rates may be used to secure more complete control, particularly of resistant weed species, to the extent that this is consistent with the tolerance of any crops present.

The benzonitrile derivatives of Formula I are particularly suitable for application to crops and crop-growing areas. By the term "crop-growing areas" is meant areas on which crops are, or will be, growing. Any diluent used should, of course, be one that is well tolerated by the crop being treated, and the benzonitrile derivative should be applied at a rate such that the crops do not suffer any substantial permanent damage.

Crops found to be particularly suitable for treatment include graminaceous crops such as grasses, for example Poa species, Festuca species, Dactylis species, Lolium species and Agrostis species, sugarcane and cereals, for example wheat, oats, barley, rye, maize, rice, millet and sorghum; legumes such as peas, beans, lucerne (alfalfa) and red and white clovers; flax; linseed; carrots; onions; and cruciferous crops such as kale, rape and cabbage. The amounts of benzonitrile derivative or derivatives of Formula I applied in the aforesaid treatments vary with the nature of the crop, the composition applied and the mode and time of application. In general, taking these factors into account, it is found that when using compounds of Formula I crops and crop-growing areas may be treated at rates of up to 8 oz. of benzonitrile derivative per acre without risk of substantial permanent damage to the crop, while graminaceous crops in particular may with safety be treated at rates of up to 1½ lb. of benzonitrile derivative per acre.

Fallow or uncultivated areas can also be treated with one or more benzonitrile derivatives of Formula I, usually in association with one or more diluents compatible with the benzonitrile derivative or derivatives, to control the growth of undesired vegetation. When used for this purpose, in which a total herbicidal effect is frequently desired, the compositions are normally applied at dosage rates higher than those used in the treatment of crops and crop-growing areas in which crops are growing and in the treatment of weeds to control their growth in the presence of crops. The precise dosage rate utilised with depend upon the nature of the vegetation treated and the effect sought, but in general dosage rates of 2 lb. to 4 lb. of benzonitrile derivative of Formula I per acre give good results.

In a similar manner to the treatment of fallow or uncultivated land, undesired vegetation growing in crop-growing areas such as plantations, orchards and vineyards may be treated to control its growth by directional application, particularly by directional spraying.

Compositions containing benzonitrile derivatives of Formula I can also be used to exercise a desiccant effect on crops such as potatoes, hops, cotton and leguminous seed-crops. For these purposes, application rates of 1 lb. to 4 lb. of benzonitrile derivative per acre give good results.

The invention includes also herbicidal compositions comprising a benzonitrile derivative of Formula I, in association with, and preferably homogeneously dispersed in, one or more compatible diluents or surface-active agents suitable for use in herbicidal compositions. The invention includes also the preparation of herbicidal compositions by a process which comprises mixing, preferably homogeneously dispersing, a benzonitrile derivative of Formula I with one or more compatible diluents or surface-active agents suitable for use in herbicidal compositions. The term "herbicidal compositions" is used in a broad sense to include not only compositions which are ready for use as herbicides, but also concentrates which must be diluted before use. The term "homogeneously dispersed" is used to include compositions in which the benzonitrile derivative is dissolved in the diluent or surface-active agent. Preferably the compositions contain 0.05 to 90% by weight of the benzonitrile derivative. The diluent may for example be a liquid which is other than an animal, vegetable or mineral oil and contains a surface-active agent; or an animal, vegetable or mineral oil; or a solid. Herbicidal compositions in the form of aerosols containing one or more of the benzonitrile derivatives of Formula I are also within the scope of the present invention.

The herbicidal compositions may contain both a diluent and a surface-active agent, e.g. a wetting, dispersing or emulsifying agent. The surface-active agent may be of the ionic or non-ionic type, for example sulphoricinoleates; quaternary ammonium derivatives; products based on condensates of ethylene oxide, such as condensates of ethylene oxide with nonyl or octyl phenol; fatty acid esters of anhydrosorbitols which have been rendered soluble by etherification of the free hydroxyl groups by condensation with ethylene oxide; alkali and alkaline earth metal salts of sulphuric acid esters and sulphonic acids such as sodium di-nonyl and di-octyl sulphosuccinates; and alkali and alkaline earth metal salts of high molecular weight sulphonic acid derivatives such as sodium and calcium lignosulphonates.

Herbicidal compositions according to the present invention may also contain, if desired, conventional adjuvants such as adhesives. If desired, other herbicidally active compounds may be included in the herbicidal compositions of the present invention, such as MCPB[γ(4-chloro-2-methylphenoxy)butyric acid], 2,4-DB (2,4-dichlorophenoxybutyric acid), MCPA (4-chloro-2-methylphenoxyacetic acid), 2,4-D (2,4-dichlorophenoxyacetic acid), CMPP [α(4-chloro-2-methylphenoxy)propionic acid], 2,4-DP (2,4-dichlorophenoxypropionic acid), α,α-dichloropropionic acid, trichloroacetic acid, 3-amino-1,2,4-triazole and Barban [4'-chlorobut-2-ynyl-N'-(3-chlorophenyl)carbamate].

Examples of suitable solid diluents are aluminum silicate, talc, calcined magnesia, kieselguhr, tricalcium phosphate, powdered cork, absorbent carbon black, and clays such as kaolin or bentonite. The solid compositions, which may take the form of dusts, granules or wettable powders, are preferably prepared by grinding the benzonitrile derivatives of Formula I with the solid diluents or by impregnating the solid diluents with solutions of the benzonitriles in volatile solvents, evaporating the solvents and, if necessary, grinding the products so as to obtain powders. Granular formulations may be prepared by absorbing the benzonitrile derivatives dissolved in volatile solvents onto the solid diluents in granular form and evaporating the solvents, or by granulating compositions in powder form obtained as described above. The wettable powders in particular, preferably contain one or more surface-active agents. Wettable powders according to the present invention may be treated with water immediately before use to give suspensions ready for application.

Suitable liquid diluents include aqueous, organic and aqueous organic liquids, for example tetrahydrofurfuryl alcohol, acetophenone, cyclohexanone, isophorone, dimethylformamide, methylcellosolve (the monomethyl ether of ethylene glycol), toluene, xylene and mineral, animal and vegetable oils. Mixtures of these diluents can be used. The liquid compositions may contain a wetting, dispersing or emulsifying agent, e.g. such as those described above, particularly when the liquid diluent is other than an animal, vegetable or mineral oil. Liquid concentrates in the form of solutions in water-miscible organic solvents which give solutions ready for use on dilution with water are particularly preferred. When desired, the emulsions of the benzonitrile derivatives of Formula I may be used in the form of self-emulsifying concentrates containing the active substance dissolved in the emulsifying agents or in solvents containing emulsifying agents compatible with the active substances, the simple addition of water producing compositions ready for use. Suitable solvents for this purpose include ketones such as cyclohexanone and isophorone. Self-emulsifying concentrates of the types which give rise to water-in-oil emulsions may also be used.

The compounds of Formula I are new chemical compounds and as such these compounds, and their preparation, form part of the present invention.

The benzonitrile derivatives of Formula I may be prepared by the acylation of a corresponding 3,5-dihalogeno-4-hydroxybenzonitrile by reaction with a reactive derivative of n-octanoic acid such as the corresponding acid halide, particularly the chloride, or anhydride. The acylation reaction may be effected according to known methods, for example by:

(i) Reaction with the acid anhydride in the presence of a small amount of a condensing agent such as concentrated sulphuric acid or reaction with the acid anhydride and an alkali metal, such as sodium or potassium, salt of the corresponding acid.

(ii) Reaction with the acid halide, for example the chloride, in the presence of a tertiary base, such as pyridine, or in the presence of a quaternary ammonium salt such as a tetralkylammonium halide, for example tetramethylammonium chloride. When pyridine is used as a condensing agent it may also act as a solvent for the reactants.

The invention is illustrated by the following examples.

In the examples the Ethylan BCP is an ethylene oxide/alkyl phenol condensate.

EXAMPLE I

An emulsifiable concentrate is formed from the following:

Percent (w./v.)
3,5-dibromo-4-octanoyloxybenzonitrile _____ 10
Ethylan BCP _____ 5
Acetophenone, q.s.p. 100% (by volume).

by dissolving the benzonitrile derivative with heating in a mixture of the Ethylan BCP and acetophenone. This concentrate is diluted with water and applied to seedling cereal crops at a rate of 0.56 kg. of benzonitrile derivative in 330 litres of water per hectate (i.e. at 8. oz./acre) to control seedling broad-leafed weeds such as *Sinapis aryensis, Chenopodium album, Matrricari inodora* and polygonum species without substantial damage to the crops.

EXAMPLE II n-Octanoyl chloride (18 g.) (prepared according to Aschar., Ber., 1898, 31, 2348) is added, dropwise, to a mechanically-stirred ice-cooled solution of 3,5-dibromo-4-hydroxybenzonitrile (28 g.) and dry pyridine (280 cc.). When the addition is complete, the cooling bath is removed and stirring continued for a further 20 hours. The mixture is then poured into a mixture of ice and excess concentrated hydrochloric acid and the resulting solid collected, washed with water and dried in vacuo over silica gel. A crude product (38 g.) is obtained which is twice recrystallized from ethanol to give 3,5-dibromo-4-n-octanoyloxybenzonitrile as a white solid, M.P. 41–43° C.

EXAMPLE III n-Octanoylchloride (13 g.) is added dropwise to a stirred mixture of 3,5-diiodo-4-hydroxybenzonitrile (27.8 g.) and pyridine (277 cc.). When the addition is complete, stirring is continued for 12 hours. The mixture is then added to ice and excess concentrated hydrochloric acid and the solid which separates is collected, washed with water and dried. The crude reaction product (37.5 g.) is crystallized from methanol (50 cc.) using charcoal to give 3,5-diiodo-4-n-octanoyloxybenzonitrile (29 g. 79%) as a white solid, M.P. 63–65° C.

We claim:
1. A method of desiccating the foliage of a crop which comprises applying to the crop a herbicidally effective quantity of a benzonitrile derivative of the general formula

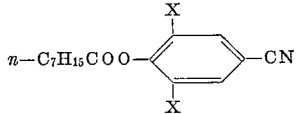

wherein X represents bromine or iodine.

References Cited

UNITED STATES PATENTS 3,349,111 10/1967 Luckenbaugh _____ 71—105X
3,397,054 8/1968 Hart et al. _____ 71—105

JAMES O. THOMAS JR., Primary Examiner

U.S. Cl. X.R.

71—82, 83, 84, 105; 260—404, 465D

PO-1050
(5/69)

UNITED STATES PATENT OFFICE
CERTIFICATE OF CORRECTION

Patent No. 3,592,626     Dated July 13, 1971

Inventor(s) BASIL JASON HEYWOOD et al

It is certified that error appears in the above-identified patent and that said Letters Patent are hereby corrected as shown below:

In the heading, insert -- Claims priority,

| | | |
|---|---|---|
| Great Britain | 36310/62 | September 24, 1962 |
| Great Britain | 1092/63 | January 9, 1963 |
| Great Britain | 12422/63 | March 28, 1963 |
| Great Britain | 36403/63 | September 16, 1963 |
| Iran | 5364 | September 9, 1963 |
| Great Britain | 37585/63 | September 24, 1963 |
| Great Britain | 49861/63 | December 17, 1963. -- |

Column 1, line 14, "1 Claim" should read -- 5 Claims --.

Col. 1, line 35, for "14" read -- 13 --

Col. 8, lines 5-6, for "herbicidally effective quantity" read -- quantity sufficient to defoliate said foliage --

Col. 8, after line 13 insert the following claims:

-- 2. A method according to claim 1 wherein said crop is a cotton crop.

-- 3. A method according to claim 1 wherein said crop is a potato crop.

-- 4. A method according to claim 1 wherein said crop is a hop crop.

-- 5. A method according to claim 1 wherein said crop is a leguminous seed crop. --

Signed and sealed this 6th day of June 1972.

(SEAL)
Attest:

EDWARD M. FLETCHER, JR.
Attesting Officer

ROBERT GOTTSCHALK
Commissioner of Patents